(12) United States Patent
Kim et al.

(10) Patent No.: US 9,417,368 B2
(45) Date of Patent: Aug. 16, 2016

(54) PRESSURE SENSITIVE ADHESIVE FILM FOR AN ORIENTATING TREATMENT IN A PHOTO-ORIENTABLE LAYER

(75) Inventors: Sin Young Kim, Daejeon (KR); Hyuk Yoon, Gwangmyeong-si (KR); Jong Sung Park, Cheongju-si (KR); Kyung Ki Hong, Cheongwon-gun (KR); Eung Jin Jang, Cheongju-si (KR); Moon Soo Park, Daejeon (KR); Doo Young Huh, Cheongwon-gun (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/244,019

(22) Filed: Sep. 23, 2011

(65) Prior Publication Data

US 2012/0013978 A1 Jan. 19, 2012

Related U.S. Application Data

(63) Continuation of application No. 13/155,837, filed on Jun. 8, 2011, which is a continuation of application No. PCT/KR2011/000492, filed on Jan. 24, 2011.

(30) Foreign Application Priority Data

Jan. 22, 2010 (KR) .................. 10-2010-0005907
Jan. 24, 2011 (KR) .................. 10-2011-0006998

(51) Int. Cl.
*G02B 5/30* (2006.01)
*B32B 7/12* (2006.01)
(Continued)

(52) U.S. Cl.
CPC ............ *G02B 5/3016* (2013.01); *B32B 7/12* (2013.01); *B32B 27/08* (2013.01); *B32B 37/12* (2013.01);
(Continued)

(58) Field of Classification Search
CPC .......... B32B 7/12; B32B 37/12; B32B 27/08; B32B 2309/105; B32B 2310/0831; B32B 2551/00; B32B 2310/0806; G02B 27/26; G02B 27/2214; G02B 5/3016; Y10T 156/1195; Y10T 428/28; Y10T 428/24132; Y10T 428/2848
USPC .................................. 427/207.1, 208.4, 487
See application file for complete search history.

(56) References Cited

U.S. PATENT DOCUMENTS

| | | | |
|---|---|---|---|
| 3,744,904 A | 7/1973 | Loprest et al. | |
| 5,327,285 A | 7/1994 | Faris | |

(Continued)

FOREIGN PATENT DOCUMENTS

| | | |
|---|---|---|
| CN | 1991439 A | 7/2007 |
| CN | 101467079 A | 6/2009 |

(Continued)

OTHER PUBLICATIONS

Yu et al. ("Polarization-Invariant Grating Based on a Photoaligned Liquid Crystal in an Oppositely Twisted Binary Configuration") Optics Letters, vol. 30, Issue 15 (2005) pp. 1995-1997.*

(Continued)

*Primary Examiner* — Robert S Walters, Jr.
(74) *Attorney, Agent, or Firm* — Rothwell, Figg, Ernst & Manbeck, P.C.

(57) ABSTRACT

The present invention relates to a pressure sensitive adhesive film for an orientating treatment of a photo-orientable layer, a laminated film, a method for preparing an optical filter or a stereoscopic image display device. In the present invention, the pressure sensitive adhesive film for an orientating treatment in a photo-orientable layer which can minimize the generation of the un-orientated regions, and can form the orientated pattern having high degrees of accuracy, and the preparation method for an optical filter using the pressure sensitive adhesive film are provided. Further, the present invention can provide the optical filter and the stereoscopic image display device having excellent performance.

5 Claims, 13 Drawing Sheets

(51) Int. Cl.
  *B32B 27/08* (2006.01)
  *B32B 37/12* (2006.01)
  *G02B 27/22* (2006.01)
  *G02B 27/26* (2006.01)

(52) U.S. Cl.
  CPC ............ *G02B 27/2214* (2013.01); *G02B 27/26* (2013.01); *B32B 2309/105* (2013.01); *B32B 2310/0806* (2013.01); *B32B 2310/0831* (2013.01); *B32B 2551/00* (2013.01); *Y10T 156/1195* (2015.01); *Y10T 428/24132* (2015.01); *Y10T 428/28* (2015.01); *Y10T 428/2848* (2015.01)

(56) References Cited

U.S. PATENT DOCUMENTS

| | | | | |
|---|---|---|---|---|
| 6,759,175 | B2 * | 7/2004 | Daems et al. | 430/199 |
| 6,770,416 | B2 * | 8/2004 | Figov | 430/270.1 |
| 6,844,034 | B2 | 1/2005 | Touhsaent | |
| 2008/0044610 | A1 | 2/2008 | Lesartre et al. | |
| 2010/0189930 | A1 * | 7/2010 | Kuwana et al. | 428/1.2 |

FOREIGN PATENT DOCUMENTS

| | | | |
|---|---|---|---|
| CN | 101589340 A | | 11/2009 |
| JP | 2001-59948 A | | 3/2001 |
| JP | 2001-59949 A | | 3/2001 |
| JP | 2008-115214 | * | 5/2008 ............ C09D 11/00 |
| KR | 1020050067966 A | | 7/2005 |
| KR | 10-2009-0081497 A | | 7/2009 |
| KR | 20-2009-0012521 U | | 12/2009 |
| KR | 1020090122906 A | | 12/2009 |
| KR | 10-1204148 B1 | | 11/2012 |
| TW | 200500644 | | 1/2005 |
| TW | 200507053 A | | 2/2005 |
| TW | 200523587 A | | 7/2005 |
| TW | 200801801 A | | 1/2008 |
| TW | 200826008 A | | 6/2008 |
| TW | 200905333 A | | 2/2009 |
| TW | 200949353 A | | 12/2009 |
| WO | 2004/029700 A1 | | 4/2004 |
| WO | WO2008/056597 | * | 5/2008 ............... G02B 5/30 |
| WO | WO 2008117677 A1 | * | 10/2008 ............... G03F 1/14 |

OTHER PUBLICATIONS

Kim et al. ("Thermal Stability of Liquid Crystal Alignment Layers Prepared by In-Situ Ultra-Violet Exposure during Imidization of Polyimide") Jpn. J. Appl. Phys. vol. 40 (2001) pp. 2381-2386.*
English translation of the abstract of JP 2008-115214.*
Office Action issued in Taiwanese Patent Appln. No. 100102513 on Apr. 18, 2014 along with English translation, 15 pages.
Office Action issued in Taiwanese Patent Application No. 103100484 on Mar. 30, 2015 along with English translation, 11 pages.
Office Action issued in Chinese Patent Application No. 2014100600000 on Aug. 10, 2015 along with English translation, 10 pages.

* cited by examiner (a)

(b)

(c)

(d)

(e)

(f)

(A)                    (B)

PRESSURE SENSITIVE ADHESIVE FILM FOR AN ORIENTATING TREATMENT IN A PHOTO-ORIENTABLE LAYER

The present application is a continuation of U.S. patent application Ser. No. 13/155,837, filed on Jun. 8, 2011, which is a continuation application of International Application PCT/KR2011/000492, with an international filing date of Jan. 24, 2011, in which priority is claimed to Korean Patent Application No. 2010-0005907, filed on Jan. 22, 2010, and to Korean Patent Application No. 2011-0006998, filed on Jan. 24, 2011, the contents of which are incorporated herein by reference.

TECHNICAL FIELD

The present invention relates to a pressure sensitive adhesive film for an orientating treatment of a photo-orientable layer, a laminated film, a method for preparing an optical filter or a stereoscopic image display device.

BACKGROUND ART

A stereoscopic image display device is a display device that is capable of displaying images having a sense of depth. Conventional display devices display information only in a two dimensional plane, i.e. their visual displaying plane, and therefore they have fundamental limitations in regards to the loss of information especially the depth of the object to be displayed.

The stereoscopic image display device can display an object in three dimensions not only on a two dimensional plane but also in space; therefore, it can display original three dimensional information of objects to an observer, and it can display more realistic information.

Techniques for displaying a three dimensional image can be classified into a glass type and a glass-free type. Also, the glass type can be classified into a polarizing glass type and a LC shutter glass type, and the glass-free type can be classified into a stereoscopic/multi-view point binocular disparity type, volumetric type, holographic type, and the like.

DISCLOSURE

Technical Problem

The present invention is intended to provide a pressure sensitive adhesive film for an orientating treatment of a photo-orientable layer, a laminated film, a method for preparing an optical filter or a stereoscopic image display device.

Technical Solution

The present invention relates to a pressure sensitive adhesive film that is used for an orientating treatment in a photo-orientable layer, and comprises a substrate in which at least one light transmissive portion and at least one light blocking portion are formed.

The pressure sensitive adhesive film is described in detail below.

In one embodiment, the pressure sensitive adhesive film may be used during a process for an orientating treatment, in which a photo-orientable layer is irradiated with light, and thereby orientating the photo-orientable layer. In one embodiment, the pressure sensitive adhesive film may be used for an orientating treatment to form a pattern including at least one first orientated region having a first orientating direction and at least one second orientated region having a second orientating direction that is different from the first orientating direction, or including at least two regions with orientating directions in different directions from each other in the photo-orientable layer. During the orientating treatment, the substrate, in which at least one light transmissive portion and at least one light blocking portion are formed, may function as a sort of mask. Particularly, since the film is a pressure sensitive adhesive film, the orientating treatment can be performed in a state where the film is attached on the photo-orientable layer, i.e. in a state where the interval between the substrate and the photo-orientable layer substantially does not exist, and therefore it is possible to prevent un-orientated regions from being generated and to form an orientated pattern having high degrees of accuracy.

The term "photo-orientable layer" as used herein may include every kind of orientable layers, which are generally used in the field, and which include molecules that can be orientated along a predetermined direction by irradiation of light. In one embodiment, the photo-orientable layer may be an orientable layer that can be orientated by irradiation of polarized ultraviolet rays, such as linearly polarized ultraviolet rays, that can then induce an orientation of liquid crystal compounds that can be formed on the orientable layer by interactions with the liquid crystal compounds.

In one embodiment, the photo-orientable layer may be an orientable layer that is used in an optical filter for a stereoscopic image display devices. Examples of the optical filter for a stereoscopic image display device may include a patterned retarder for a stereoscopic image display device.

The term "light transmissive portion" as used herein means the region of the substrate, through which light irradiated from the upper or the lower side of the substrate can pass, and the term "light blocking portion" as used herein means the region of the substrate, through which light irradiated from the upper or the lower side of the substrate cannot pass.

FIG. 1 is a cross sectional drawing that shows one example of the substrate (10) included in the pressure sensitive adhesive film. As shown in FIG. 1, the substrate (10) of the pressure sensitive adhesive film includes at least one light transmissive portion (T), through which light irradiated in the thickness direction can pass, and at least one light blocking portion (B), which can cut off or absorb the light. The light is indicated as arrows in FIG. 1. One or two or more light transmissive portions and one or two or more light blocking portions may be formed in the substrate respectively.

Shapes of the light transmissive portion and the light blocking portion are not particularly limited, but they can be formed according to the required orientated pattern of the photo-orientable layer.

In one embodiment, the light transmissive portion and the light blocking portion may have stripe shape extending in a common direction, and may be alternately arranged on the short-sided direction of the stripe shape. FIG. 2 is a drawing that shows an illustrative example of the substrate observed from the upper side thereof. In the substrate (10) of FIG. 2, the transmissive portion (T) and the light blocking portion (B) have a stripe shape extending in a common direction respectively, and are alternately arranged on the short-sided direction of the stripe shape.

In cases where the transmissive portion (T) and the light blocking portion (B) have a stripe shape extending in a common direction respectively, and are alternately arranged on the short-sided direction of the stripe shape, the pitch of the above portions, i.e. the sum of the width of the light blocking portion and the interval of the adjacent light blocking portions and the interval of the adjacent blocking portions are not particularly limited, but they can be controlled according to the use of the photo-orientable layer. The pitch is designated as P and the interval is designated as V in FIG. 2.

For example, in cases where the photo-orientable layer is a photo-orientable layer used in an optical filter for a stereoscopic image display devices, the pitch of the light transmissive portion and the light blocking portion may be twice as long as the width of a unit pixel forming an image for the right eye or a unit pixel forming an image for the left eye. Conventionally, as shown in FIG. 6, a stereoscopic image display device may include an element for displaying images such as a display panel (62) and an optical filter (63) such as a patterned retarder. Also, in the above, the element for displaying images may include a unit pixel (a unit pixel for a left eye, (UL)) for forming an image for the left eye and a unit pixel (a unit pixel for a right eye, (UR)) for forming an image for the right eye, both of which may have a stripe shape extending in a common direction respectively, and may be alternately arranged on the short-sided direction of the stripe shape as in FIG. 3. In cases where the photo-orientable layer, to which the pressure sensitive adhesive film is applied, is used in the optical filter for the stereoscopic image display devices as described above, it is preferable for the pitch (P) to have the same value as the value twice the width of the unit pixel (UR) or (UL) in the element for displaying images. In FIG. 3, the width of the unit pixel (UR) or (UL) is designated as W1 or W2.

The term "the same value" as used herein includes substantially the same value within a range without losing the advantages of the invention, and includes some error caused by various factors such as manufacturing errors and variations.

For example, the pitch having the same value as the value twice the width of the unit pixel includes errors within approximately ±60 µm, errors within approximately ±40 µm or errors within approximately ±20 µm.

In the present invention, the pitch of the substrate may be controlled as described above, and therefore, it is possible to prevent un-orientated regions from being generated after the orientating treatment, and to form an orientated pattern having high degrees of accuracy. Therefore, in cases where the optical filter, including the above orientable layer is used in the stereoscopic image display devices, it is possible to prevent so-called crosstalk from being generated in the device.

Also, in the above, it is preferable for the interval (ex. (V) in FIG. 2) between the adjacent light blocking portions to have the same value as the width (ex. (W1) or (W2) in FIG. 3) of the unit pixel (UR) or (UL) in the element for displaying images of the stereoscopic image display device. As described above, the term "the same value" as used herein means substantially the same value, and for example it may include errors within approximately ±30 µm, errors within approximately ±20 µm or errors within approximately ±10 µm.

In the present invention, the interval may be controlled to be the same as the width of the unit pixel; therefore, it is possible to prevent un-orientated regions from being generated after the orientating treatment, and to form an orientated pattern having high degrees of accuracy. Also, in cases where the optical filter, including the above orientable layer is used in the stereoscopic image display devices, it is possible for the respective polarization transforming parts to correspond the unit pixels with high degrees of accuracy, and therefore it is possible to prevent so-called crosstalk from being generated in the device.

In the substrate of the present invention, the shapes of the light transmissive portion and the light blocking portion are not limited to the stripe as described above, but they may be changed according to the shapes of the element for displaying images, or other applications to which the photo-orientable layer may be applied.

For example, in cases where the photo-orientable layer is a photo-orientable layer used in an optical filter for a stereoscopic image display devices as above, and the unit pixels forming an image for the left eye and an image for the right eye in the element for displaying images are formed in a cross stripe pattern, the light transmissive portion and the light blocking portion may also be formed in a cross stripe pattern which corresponds to the pattern of the unit pixels. In this case, the pitch and the interval of the light transmissive and light blocking portions may be controlled in the same manner as described above. For example, the pitch of the light transmissive portion and the light blocking portion may have substantially the same values as the value twice the width of the unit pixel which is formed in the cross stripe pattern; and also the interval between the adjacent light blocking portions may have substantially the same value as the width of the unit pixel. In the above, the pitch and the interval may be the lengthwise or breadthwise pitch and the lengthwise or breadthwise interval in the cross stripe pattern of the light transmissive portion and the light blocking portion, and the width of the unit pixel may be the lengthwise or breadthwise width in the cross stripe pattern of the unit pixels.

In the present invention, the substrate may include, for instance, a light transmissive sheet; and light blocking or light absorbing inks that form the light blocking portions on the sheet.

That is, the substrate may be prepared by forming the light blocking portion by printing the light blocking or light absorbing ink on the light transmissive sheet according to required patterns.

In the above, the light transmissive sheet means a sheet, through which an effective amount of light, which is used to orientate the photo-orientable layer, such as ultraviolet rays can pass, and the effective amount may mean such an amount that the photo-orientable layer can be effectively orientated. For example, the light transmissive sheet may be a sheet having a low light absorption rate, and may be a sheet having the light absorption rate of approximately 10% or less with respect to the light having a wavelength of approximately 320 nm or less. The light transmissive sheet as described above may be, for example, a cellulose sheet such as a triacetyl cellulose sheet; or an olefin sheet such as a sheet formed of norbornene derivatives, but the light transmissive sheet usable herein is not limited thereto as long as it has an appropriate light transmissive property. The thickness of the sheet is not particularly limited herein, and it may be controlled considering the required application, light transmissive rate, and the like.

The sheet as described above may be also used as a substrate for a protective film which is used for preventing contamination in the orientable layer and improving orientability during the process for preparing an optical filter. In one embodiment, the light blocking portion may be directly formed in the substrate of the protective film, and therefore, the film may become not only the protective film but also the pressure sensitive adhesive film as a mask. Therefore, by using a simple method, in which the orientable layer is irradiated with light before or after the attachment of the film, it becomes possible to increase the productivity of the optical filter having high degrees of accuracy without additional equipment.

Kinds of ink forming the light blocking portion in the sheet are not particularly limited, but any light blocking or light absorbing inks, which are known in the field, may be used. As above, inks including inorganic pigments such as carbon black, graphite or oxidized steel; or organic pigments such as azo pigment or phthalocyanine pigment may be exemplified, and the above described inks may be used in the printing process after being mixed with the appropriate binders and/or solvents.

In the above, printing methods for forming the light blocking portion are not particularly limited, but, for example, conventional printing methods such as screen printing or gravure printing or selective jetting methods by ink jetting may be used.

Herein, the printing height of the inks may be approximately 0.1 μm to 4 μm, preferably approximately 0.5 μm to 2.0 μm. However, the printing height is not limited thereto. For example, if the printing height is excessively low, the light blocking property may be decreased, and if the printing height is excessively high, it may become difficult to use the film as a protective film, and therefore the printing height may be controlled considering the above matters.

The pressure sensitive adhesive film may further include a pressure sensitive adhesive layer that is formed on at least one side of the substrate, and the pressure sensitive adhesive layer may be used to attach the substrate on the photo-orientable layer. In the above, the attachment may mean a state where the interval between the substrate and the photo-orientable layer substantially does not exist. FIG. 4 is a cross sectional drawing of one illustrative example of the pressure sensitive adhesive film, and, as shown in FIG. 4, the pressure sensitive adhesive film may include a substrate (10) in which at least one light transmissive portion (T) and at least one light blocking portion (B) are formed; and a pressure sensitive adhesive layer (20) that is formed on one side of the substrate (10).

In the above, the materials and the thickness of the pressure sensitive adhesive layer are not particularly limited, and they are appropriately selected considering the conditions of the orientating treatment, and the like. For example, the pressure sensitive adhesive layer may include light transmissive pressure sensitive adhesives, and may include, for example, an acrylic pressure sensitive adhesive, a urethane pressure sensitive adhesive, a polyisobutylene pressure sensitive adhesive, a rubber pressure sensitive adhesive such as a SBR (styrene-butadiene rubber), a polyvinylether pressure sensitive adhesive, an epoxy pressure sensitive adhesive, a melamine pressure sensitive adhesive, a polyester pressure sensitive adhesive, a phenol pressure sensitive adhesive or a silicon pressure sensitive adhesive; or a hybrid pressure sensitive adhesive including at least two of the aforementioned.

The present invention also relates to a laminated film used for preparing an optical filter that comprises a base; a photo-orientable layer that is formed on the base; and the pressure sensitive adhesive film that is attached on the photo-orientable layer.

Kinds of bases used in the laminated film are not particularly limited, but, for example, any conventional base used for the optical filter may be used. For the base, a conventional glass base or plastic base may be used. For plastic bases, a plastic base prepared by using a TAC (triacetyl cellulose), a COP (cyclo olefin copolymer), a Pac (Polyacrylate), a PES (poly ether sulfone), a PC (polycarbonate), a PEEK (polyetheretherketon), a PMMA (polymethylmethaacrylate), a PEI (polyetherimide), a PEN (polyethylenemaphthatlate), a PET (polyethyleneterephthalate), a PI (polyimide), a PSF (polysulfone), a PVA (polyvinylalcohol), a PAR (polyarylate) and/or an amorphous fluoro-resin may be exemplified.

In one embodiment, in cases where the optical filter is a patterned retarder, for the plastic base, a base having (−) c plate property, and having a $R_e$ of approximately 10 nm or less and preferably approximately 5 nm or less; a $R_{th}$ of approximately 300 nm or less, preferably approximately 100 nm or less, more preferably approximately 60 nm or less and further more preferably approximately 15 nm or less; and an refractive index of approximately 1.33 to 1.53 may be used.

In the above, a (−) c plate property means a property satisfying the relation of "$N_x=N_y>N_z$," a $R_e$ means a value calculated by "$(N_x-N_y)\times d$," and a $R_{th}$ means a value calculated by "$\{(N_x+N_y)/2-N_z\}\times d$." In the above, an $N_x$ means a refractive index of the base along the slow axis direction in a plane, a $N_y$ means a refractive index of the base along the fast axis direction in a plane, a $N_z$ means a refractive index of the base along the thickness direction, a d means a thickness of the base.

By using the plastic base having the optical anisotropy as described above, for example, in cases where the optical filter is a patterned retarder, it is possible to maximize the performance of the retarder in the device while minimizing crosstalk, and it is possible for the device to have excellent brightness. Also, by using such a plastic base, it is possible to produce an optical filter which is light-weight, thin and has excellent flexibility.

Conventionally, if a plastic base is used for the base of the optical filter, because of inherent properties of the plastic base, it is not possible to form an orientating pattern having high degrees of accuracy, since the base is seriously affected by forming temperature, solvents, expansion and/or contraction of the orientable layer during its preparation. However, according to the orientating treatment by using the pressure sensitive adhesive film of the present invention, it is possible to maximize the advantage of the plastic base without inducing the above problems.

Kinds of the orientable layer in the laminated film are not particularly limited, but every kind of conventional orientable layer used in the art may be used. In one embodiment, the orientable layer may include compounds, of to which the orientating direction is determined by a cis-trans isomerization reaction, a Fries rearrangement reaction and/or a dimerization reaction induced by irradiation of linearly polarized ultraviolet rays, which can induce the orientation of the adjacent liquid crystal according to the determined orientating direction thereof. For example, the orientable layer may include a monomer, oligomer or polymer compound having at least one functional group or moiety selected from the group consisting of an azobenzene, a styryl benzene, a coumarine, a chalcone, fluorine and a cinnamate, and may preferably include norbornene resin having fluorine or cinnamate moiety.

Methods to form the orientable layer on the base are not particularly limited, but for example, a method in which the above described compound is diluted by the appropriate solvents and then coated on the base by conventional coating methods such as roll coating, spin coating or bar coating may be used. Also, the coating thickness of the orientable layer is not particularly limited.

In one embodiment, the photo-orientable layer may be a preliminarily orientating treated photo-orientable layer. The preliminary orientating treatment may be performed, for example, by, before the attachment of the pressure sensitive adhesive film, irradiating the photo-orientable layer with linearly polarized ultraviolet rays. In the preliminary orientating treatment, preferably, the entire surface of the orientable layer may be irradiated with linearly polarized ultraviolet rays.

If linearly polarized ultraviolet rays are irradiated more than once in order to orientate the photo-orientable layer, the orientating direction is determined by the last irradiated linearly polarized ultraviolet ray. Accordingly, if the orientable layer included in the laminated film is preliminarily orientated by linear polarized ultraviolet rays having a predetermined direction, and then, after the attachment of the pressure sensitive adhesive film, a secondary orientating treatment is performed by irradiating linearly polarized ultraviolet rays having a different direction from that of the linearly polarized ultraviolet rays in the preliminary orientating treatment, it is possible to effectively form an orientated pattern including at least one first orientated region having a first orientating direction and at least one second orientated region having a second orientating direction that is different from the first orientating direction, or including at least two kinds of regions with orientating directions having different directions from each other.

In one embodiment, the preliminary orientating treatment may be performed by linearly polarized ultraviolet rays, and the linearly polarized ultraviolet rays may be ultraviolet ray which is linearly polarized so as to intersect and form an angle, other than a right angle, with the border of the light transmissive portion and the light blocking portion formed in the pressure sensitive adhesive film, and more preferably may be an ultraviolet ray which is linearly polarized so as to intersect and form an angle of substantially 45 degrees with the border of the light transmissive portion and the light blocking portion formed in the pressure sensitive adhesive film. In the present invention, when the angle is defined, it includes errors within approximately ±10 degrees, errors within approximately ±5 degrees or errors within approximately ±3 degrees. In the above case, the secondary orientating treatment may also be performed by linearly polarized ultraviolet rays, and the linearly polarized ultraviolet ray of the secondary orientating treatment may be a ultraviolet ray which is linearly polarized so as to intersect and form an angle, other than a right angle, with the border of the light transmissive portion and the light blocking portion formed in the pressure sensitive adhesive film. Also, in this case, it is preferable for the linearly polarized ultraviolet ray of the secondary orientating treatment to have a direction to form an angle of substantially 90 degrees with that of the linearly polarized ultraviolet ray of the preliminary orientating treatment. By controlling the directions of the linearly polarized ultraviolet rays of the preliminary and the secondary orientating treatment, it is possible to provide an optical filter allowing for excellent performance in the device.

The laminated film may be prepared by attaching the pressure sensitive adhesive film on the photo-orientable layer which has been subjected to the preliminary orientating treatment or which is not orientated. In cases where the pressure sensitive adhesive film includes a pressure sensitive adhesive layer, the pressure sensitive adhesive film may be attached on the photo-orientable layer through the pressure sensitive adhesive layer. It is preferable for the pressure sensitive adhesive film to be closely attached on the photo-orientable layer. The term "close attachment" as used herein means a case where the intervals between the pressure sensitive adhesive film and the photo-orientable layer substantially do not exist. By closely attaching the pressure sensitive adhesive film on the photo-orientable layer, it is possible to prevent the irradiated light from being diffused between the interval, and therefore to irradiate the photo-orientable layer with light having desirable uniform intensity. Also, it is possible to prevent the border between orientated regions from being unclear, and to prevent un-orientated regions from being generated.

The present invention also relates to a process for preparing an optical filter by using the laminated film of the present invention. The process for preparing an optical filter may include a step of irradiating the photo-orientable layer of the laminated film with light via the substrate of the pressure sensitive adhesive film of the laminated film.

In cases where the photo-orientable layer is irradiated with light via the pressure sensitive adhesive film, light can pass only through the light transmissive portion of the pressure sensitive adhesive film, and therefore only the region of the photo-orientable layer corresponding to the light transmissive portion of the pressure sensitive adhesive film is orientated. That is, the orientating direction induced by the preliminary orientating treatment in the region of the photo-orientable layer corresponding to the light transmissive portion of the pressure sensitive adhesive film is changed, or the un-orientated region of the photo-orientable layer corresponding to the light transmissive portion of the pressure sensitive adhesive film is orientated.

In one embodiment, as described above, the photo-orientable layer may a preliminarily orientating treated photo-orientable layer by linearly polarized ultraviolet rays. The linearly polarized ultraviolet rays may be linearly polarized ultraviolet rays having a direction to intersect and form an angle, other than a right angle, with a border of the light transmissive portion and the light blocking portion formed in the pressure sensitive adhesive film, and more preferably may be a linearly polarized ultraviolet ray having a direction intersecting and forming an angle of substantially 45 degrees with the border of the light transmissive portion and the light blocking portion formed in the pressure sensitive adhesive film. In this case, the light irradiated in the present process may be light for the secondary orientating treatment, and the light for the secondary orientating treatment may be linearly polarized ultraviolet rays having a direction intersecting and forming an angle, other than a right angle, with a border of the light transmissive portion and the light blocking portion formed in the pressure sensitive adhesive film, and also forming an angle of substantially 90 degrees with the direction of the linearly polarized ultraviolet rays of the preliminary orientating treatment.

FIG. 5 is a drawing showing one illustrative example of the process for preparing an optical filter of the present invention. As shown in FIG. 5(a) to (d), the process for preparing an optical filter may include forming the photo-orientable layer (2) on the base (1) (FIG. 5(a)), orientating the photo-orientable layer (2) preliminarily by linearly polarized ultraviolet rays (arrows) (FIG. 5(b)), attaching the pressure sensitive adhesive film (3) on the photo-orientable layer (2) (FIG. 5(c)), and then orientating the photo-orientable layer secondarily by ultraviolet rays (arrows) which are linearly polarized so as to have a different direction from that of the linearly polarized ultraviolet rays in the preliminary orientating treatment (FIG. 5(d)). By the above treatment, regions (21) and (22), of which orientating directions are different from each other, can be formed in the photo-orientable layer.

The process for preparing an optical filter of the present invention may further include detaching the pressure sensitive adhesive film (3) after the irradiation of light, and then forming a liquid crystal layer (4) on the photo-orientable layer (2), as shown in illustrative example of FIGS. 5 (e) and (f).

In the above, methods for forming the liquid crystal layer (4) are not particularly limited, and, for example, may include: (a) coating and orientating photo-crosslinkable or photo-polymerizable liquid crystal compounds on the photo-orientable layer, and then (b) photo-crosslinking or photo-polymerizing the liquid crystal compounds. By the above treatment, regions (41) and (42), of which orientating directions of the liquid crystal compounds are different from each other, can be formed on the photo-orientable layer.

Kinds of the liquid crystal compounds are not particularly limited, and they may be selected considering the application of the optical filter. For example, in cases where the optical filter is a patterned retarder, the liquid crystal compounds may be compounds, which can be orientated according to the orientated pattern of the photo-orientable layer and then can be transformed to a liquid crystal polymer layer showing a phase retardation property of λ/4 by the photo-crosslinking or photo-polymerization. By using such liquid crystal compounds, it is possible to prepare a patterned retarder which can divide the irradiated light into left-circularly polarized light and right-circularly polarized light. In the field, various liquid crystal compounds which are usable according to the application of the optical filter are known, and all of the above compounds can be used in the present invention.

In the above, methods to align the liquid crystal compounds according to the orientated pattern of the photo-orientable layer after coating them on the photo-orientable layer are not particularly limited, but every kind of known aligning method may be appropriately selected and used.

After the above, it is possible to form the liquid crystal layer such as the phase retardation layer by crosslinking or polymerizing the aligned liquid crystal compound by irradiation of appropriate light.

The present invention also relates to an optical filter that includes a base; and a photo-orientable layer that is formed on the base and has at least one first orientated region having a first orientating direction, and at least one second orientated region having a second orientating direction that is different from the first orientating direction, wherein the ratio of the area of un-orientated region in the photo-orientable layer, relative to the entire area of the photo-orientable layer, is 10% or less.

In one embodiment, the optical filter may be an optical filter used in a stereoscopic image display device, and preferably may be a patterned retarder used in a stereoscopic image display device.

In the above optical filter, the contents regarding a usable base and photo-orientable layer may be as described above.

In the optical filter, an orientated pattern is formed on the photo-orientable layer, and specifically, an orientated pattern including at least one first orientated region that is treated so as to have a first orientating direction, and at least one second orientated region that is treated so as to have a second orientating direction that is different from the first orientating direction may be formed on the photo-orientable layer. In one embodiment the first orientated region and the second orientated region may have a stripe shape extending in a common direction, and be alternately arranged in a short-sided direction of the to stripe shape in the photo-orientable layer.

In the optical filter, the ratio of the area of un-orientated region in the photo-orientable layer, relative to the entire area of the photo-orientable layer is 10% or less, preferably 5% or less, and more preferably 2% or less. The un-orientated region may be formed, for example, by phenomena such as the diffusion of light, which is generated when the light passes through the intervals between a photo-orientable layer and a mask in the conventional orientating method. The un-orientated region may result in unclear borders between orientated regions and crosstalk in the device.

However, in the present invention, the orientating treatment can be performed under the state where the pressure sensitive adhesive film, which may function as a mask, is closely attached on the photo-orientable layer, and therefore it is possible to minimize the generation of the un-orientated region.

In the above, the ratio of the area of un-orientated region can be evaluated as below. That is, if the optical filter is disposed between two polarizers, of which light absorbing axises are perpendicular to each other, by appropriately aligning the orientating directions of the optical filter along the light absorbing axises of polarizers, and then the polarizers are lighted by a light source, light leakage is generated only at the un-orientated regions. Therefore, the ratio of the area of un-orientated region can be evaluated by observing the regions, at which the light leakage is generated, by a polarizing microscope under the state as described above.

Also, the optical filter may have a crosstalk ratio of 5% or less, and more preferably 2% or less. The crosstalk ratio may be calculated by the below general formula 1.

$$X_T=(X_{TL}+X_{TR})/2 \quad \text{[General Formula 1]}$$

In the General formula 1, $X_T$ represents the crosstalk ratio of a stereoscopic image display device to which the optical filter is applied, $X_{TL}$ represents the crosstalk ratio observed with the left eye of a stereoscopic image display device to which the optical filter is applied, and $X_{TR}$ represents crosstalk ratio observed with the right eye of a stereoscopic image display device to which the optical filter is applied.

In the General formula 1, the $X_{TL}$ and $T_{TR}$ can be calculated by the below general formulas 2 and 3 respectively.

$$X_{TL}=\{(L_{(LB-RW)}-L_{(LB-RB)}/(L_{(LW-RB)}-L_{(LB-RB)})\}\times 100 \quad \text{[General Formula 2]}$$

$$X_{TR}=\{(L_{(LW-RB)}-L_{(LB-RB)}/(L_{(LB-RW)}-L_{(LB-RB)})\}\times 100 \quad \text{[General Formula 3]}$$

In the General formulas 2 and 3, $L_{(LB-RW)}$ represents the brightness evaluated when the pixel for the left eye is black and the pixel for the right eye is white in a stereoscopic image display device to which the optical filter is applied, $L_{(LB-RB)}$ represents the brightness evaluated when the pixel for the left eye and the pixel for the right eye are black in a stereoscopic image display device to which the optical filter is applied, and $L_{(LW-RB)}$ represents the brightness evaluated when the pixel for the left eye is white and the pixel for the right eye is black in a stereoscopic image display device to which the optical filter is applied.

In the above, the methods for evaluating the brightness required for calculating the above General formulas 2 and 3 are not particularly limited, and they can be measured by using conventional methods which are known in the art.

In the present invention, it is possible to provide the optical filter having a low crosstalk ratio by preventing the un-orientated region from being generated, since the photo-orientable layer is orientated by using the pressure sensitive adhesive as described above.

The optical filter of the present invention may further include a liquid crystal layer that is formed on the photo-orientable layer. Also, in cases where the optical filter is a patterned retarder, the liquid crystal layer may be a phase retardation layer. In one embodiment, the phase retardation layer may be a phase retardation layer that has retardation of λ/4. In the phase retardation layer, a pattern which is formed according to the orientated pattern of the photo-orientable layer below it, and which includes at least one first region having a first slow axis of a first direction, and at least one second region having a second slow axis of a second direction that is different from the direction of the first slow axis may be formed. Also, for example, the first and second regions may have stripe shape extending in a common direction, and may be alternately arranged in a short-sided direction of the stripe shape, as in FIG. 2.

In the above, the first slow axis of the first region may have a direction intersecting and forming an angle, other than a right angle, for example substantially 45 degrees with the border of the first and the second region. Also, the second slow axis of the second region may have a direction intersecting and forming an angle, other than a right angle with the border of the first and the second regions and forming an angle of substantially 90 degrees with the direction of the first slow axis.

The phase retardation layer that has retardation of λ/4 and that has a relation of the slow axises may form left-circularly polarized light and right-circularly polarized light respectively when applying to a stereoscopic image display device.

The present invention also relates to a stereoscopic image display device that includes the optical filter as described above.

In one embodiment, the optical filter may be a patterned retarder and the stereoscopic image display device may be a polarizing glass type stereoscopic image display device.

In the stereoscopic image display device as described above, elements constituting the device or the operating principles are not particularly limited, and every kind of conventional devices can be applied as long as the device includes the optical filter of the present invention.

FIG. 6 is a cross sectional drawing of one illustrative example of the device according to an embodiment.

The display device (60) may be a polarizing glass type, which displays a 3-dimensional image to an observer (not shown) by putting on a polarizing glass. The display device (60) may be configured by sequentially arranging a backlight unit (61), a display panel (62) such as a liquid crystal display panel, and a retarder (63). In the above, the retarder (63) may be the optical filter of the present invention, and may include a base (631), a photo-orientable layer (not shown in FIG. 6) formed on the base, and a liquid crystal layer (632) that is formed on the photo-orientable layer and that has the first and second regions (632A) and (632B) as described above. The liquid crystal layer (632) may be the phase retardation layer. In the display device (60), a surface of the retarder (63) is an image display surface, and is pointed to the observer side. In addition, in the embodiment, the display device (60) is disposed such that the image display surface is parallel to a perpendicular surface (vertical surface, a y-z plane in FIG. 6). Further, the image display surface may have, for example, a rectangular shape, and the longitudinal direction of the image display surface is parallel to the horizontal direction (y-axis direction in the figure). Further, the observer observes the image display surface while putting on the polarizing glass in front of eye balls of the observer.

The backlight unit (61) may have, for example, a reflective plate, a light source and an optical sheet (all are not shown). The reflective plate returns light emitted from the light source to an optical sheet side, and has functions of reflection, scattering, diffusion and the like. The reflective plate includes, for example, PET (Polyethylene Terephthalate) foam. Thus, light emitted from the light source may be efficiently used. The light source irradiates the display panel (62) from the back, and may include, for example, a plurality of linear light sources arranged in parallel at constant intervals, or a plurality of point-like light sources arranged in a two-dimensional array. In addition, as the linear light source, for example, a hot cathode fluorescent lamp (HCFL), a cold cathode fluorescent lamp (CCFL) or the like is listed. As the point-like light source, for example, a light emitting diode (LED) or the like is listed. The optical sheet equalizes the in-plane luminance distribution of light from the light source, or adjusts the angle of divergence and polarization state of light from the light source into a desired range, and includes, for example, a diffusion plate, a diffusion sheet, a prism sheet, a reflective polarizing element, and a phase difference plate. Further, the light source may be of an edge light type. In such a case, a light guide plate or a light guide film is used as deemed necessary.

The display panel (62) may be a transmissive liquid crystal display panel in which a plurality of pixels are two-dimensionally arranged in row and column directions, and drives each pixel in accordance with a picture signal for image display. As described above, the pixels may include, for example as shown in FIG. 3, the pixel for a left eye and the pixel for a right eye. The display panel (62) may have, for example, a transparent substrate (622), pixel electrodes (623), an alignment film (624), a liquid crystal layer (625), an alignment film (626), a common electrode (627), a color filter (628) and a transparent substrate (629) (counter substrate) in order from a backlight unit (10) side as shown in FIG. 6. Also, in the present invention, a first polarizing plate (621A) is attached on the transparent substrate (622), and a second polarizing plate (621B) is attached on the transparent substrate (629).

The first polarizing plate (621A) is disposed on a light incidence side of the display panel (62), and the second polarizing plate (21B) is disposed on the light emitting side of the display panel (62). The polarizing plates (621A) and (621B) are a kind of optical shutter, and transmits only light (polarized light) in a certain vibration direction. For example, the polarizing plates (621A) and (621B) are disposed such that polarization axes thereof are different by a certain angle (for example, 90 degrees) from each other, so that emitted light from the backlight unit (61) is transmitted through the liquid crystal layer, or blocked by the liquid crystal layer.

A direction of an absorbing axis (not shown) of the first polarizing plate (621A) is set within a range in which light emitted from the backlight unit (61) may be transmitted. For example, when a polarization axis of light emitted from the backlight unit (61) is in a vertical direction, the transmission axis of the polarizing plate (621A) is also in a vertical direction, and when a transmission axis of light emitted from the backlight unit (61) is in a horizontal direction, the transmission axis of the polarizing plate (621A) is also in a horizontal direction. In addition, light emitted from the backlight unit (61) is not limited to linearly polarized light, and may be circularly or elliptically polarized light, or non-polarized light.

The direction of an absorbing axis of the second polarizing plate (621B) is set within a transmittable range of light transmitted by the display panel (62). For example, when an absorbing axis of the first polarizing plate (621A) is in a horizontal direction, the absorbing axis of the second polarizing plate (621B) is in a direction (perpendicular direction) orthogonal to the horizontal direction. When the absorbing axis of the first polarizing plate (621A) is in a perpendicular direction, the absorbing axis of the second polarizing plate (621B) is in a direction (horizontal direction) orthogonal to the perpendicular direction.

The transparent substrates (622) and (629) are typically transparent to visible light. In addition, a transparent substrate on a backlight unit (61) side has, for example, an active drive circuit formed thereon. The circuit includes TFT (Thin Film Transistor) as drive elements electrically connected to transparent pixel electrodes and wiring lines. The pixel electrodes (623) include, for example, Indium Tin Oxide (ITO), and function as electrodes for each of pixels. The alignment film (624) includes, for example, a polymer material such as polyimide for alignment treatment of liquid crystal. The liquid crystal layer (625) includes, for example, VA (Vertical Alignment) mode liquid crystal, TN (Twisted Nematic) mode liquid crystal, or STN (Super Twisted Nematic) mode liquid crystal. The liquid crystal layer (625) has a function of transmitting or blocking light emitted from the backlight unit (61) for each pixel in response to the applied voltage from a not-shown drive circuit. The common electrode (627) includes, for example, ITO, and functions as a common counter electrode. The color filter (628) is formed by arranging filter sections (628A) for separating light emitted from the backlight unit (61) into, for example, respective light of three primary colors of red (R), green (G) and blue (B). The color filter (628) has a black matrix section (628B) having a light blocking function in a region between the filter sections (28A) corresponding to a boundary between pixels.

In one embodiment, the optical filter (63) of the present invention may divide light irradiated from the second polarizing plate (621B) into left-circularly polarized light and right-circularly polarized light, and deliver them to an observer with a polarizing glass.

Advantageous Effects

In the present invention, the pressure sensitive adhesive film for an orientating treatment in a photo-orientable layer which can prevent the generation of un-orientated regions, and can form an orientated pattern having high degrees of accuracy, and the preparation method for an optical filter using the pressure sensitive adhesive film may be provided. Further, the present invention can provide the optical filter and the stereoscopic image display device having excellent performances.

BEST MODE

The present invention is explained in more detail through the following examples according to the present invention and comparative examples regardless of the present invention, to which the scope of the present invention is not restricted.

Example 1

Preparation of the Pressure Sensitive Adhesive Film for an Orientating Treatment The light blocking portions were formed on triacetylcellulose (TAC) sheet (UZ80, manufactured by FUJI), which was a light transmissive sheet, by printing light blocking inks thereon. In this case, the light blocking portions were formed such that they had stripe shapes, and the light transmissive portion and the light blocking portion were alternately arranged as in FIG. 2. The pitch (P) of the light transmissive portion and the light blocking portion was about 1080 μm, and the interval between the adjacent light blocking portions was about 540 μm, and the printing height of the inks was about 1.5 μm. Then, a pressure sensitive adhesive film for an orientating treatment was prepared by forming a pressure sensitive adhesive layer on a side of the TAC base opposite to the printing side thereof by using acrylic pressure sensitive adhesive. A picture of the front side of the prepared pressure sensitive adhesive film is shown in FIG. 7.

Preparation of the Optical Filter

By using the pressure sensitive adhesive film, an optical filter was prepared by the way shown in FIG. 5. Firstly, a polycinnamate type photo-orientable layer (2) was formed on a triacetylcellulose base (1) having a thickness of 80 μm such that the layer (2) had a thickness of 1,000 Å when it was dried. The photo-orientable layer (2) was formed by coating a solution for forming a photo-orientable layer on base (1) through a roll coating method, and eliminating solvents by drying it at 80° C. for 2 minutes. The solution (polynorbonene:acrylic monomers:photoinitiator=2:1:0.25 (weight ratio)) was prepared by mixing a mixture of polynorbonene (weight average molecular weight: 150,000) having cinnamate group represented by the Formula 1 below and acrylic monomers with a photoinitiator (Igacure 907) and dissolving it in cyclohexanone solvent so as for the solid content of the polynorbonene to be 2 weight %.

[Formula 1]

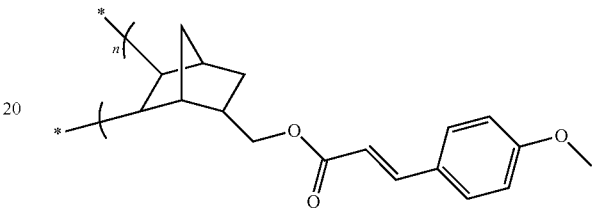

Then, the photo-orientable layer (2) was preliminarily orientated by irradiating it with linearly polarized ultraviolet ray (300 mW/cm$^2$). The polarizing direction of the linearly polarized ultraviolet ray in the preliminary orientation was controlled so as to form an angle of substantially 45 degrees with a border of the light transmissive portion (T) and the light blocking portion (B) of the pressure sensitive adhesive film (3) to be attached after the preliminary orientating treatment. After the preliminary orientation, the pressure sensitive adhesive film (3) was closely attached on the photo-orientable layer (2) via the pressure sensitive adhesive layer. Then, a secondary orientation was performed by irradiating the photo-orientable layer (2) with linearly polarized ultraviolet rays (300 mW/cm$^2$) via the pressure sensitive adhesive film (3). In the secondary orientation, the polarizing direction of the linearly polarized ultraviolet ray was controlled so as to form an angle of 90 degrees with the polarizing direction of the linearly polarized ultraviolet rays in the preliminary orientation. After completing the orientating process, the pressure sensitive adhesive film (2) was peeled off, and a phase retardation layer (4) having a phase retardation property of λ/4 was formed thereon. Concretely, liquid crystal compounds (LC242™, manufactured by BASF) were coated on the photo-orientable layer (2) such that they had a thickness of 1 μm when they were dried. They were orientated according to the orientated pattern of the photo-orientable layer (2), and they were crosslinked and polymerized by irradiating them with ultraviolet ray (300 mW/cm$^2$) for about 10 seconds, so as to prepare an optical filter including two kinds of regions with slow axises having different directions from each other according to the orientated pattern of the photo-orientable layer (2).

Comparative Example 1

An optical filter was prepared by the same process as in Example 1, except that the pressure sensitive adhesive film (2) was not used, and a mask which was conventionally used for orientating a photo-orientable layer was used. Specifically, the secondary orientating treatment was performed by irradiating the preliminary treated photo-orientable layer with the linearly polarized ultraviolet ray via the mask, under the condition where the mask was positioned on the photo-orientable layer where the distance between the mask and the photo-orientable layer was maintained at 0.7 mm.

Comparative Example 2

An optical filter was prepared by the same process as in Example 1, except that the pressure sensitive adhesive film (2) was not used, and a mask which was conventionally used for orientating a photo-orientable layer was used. Specifically, the secondary orientating treatment was performed by irradiating the preliminary treated photo-orientable layer with the linearly polarized ultraviolet ray via the mask under the condition where the mask was positioned on the photo-orientable layer where the distance between the mask and the photo-orientable layer was maintained at 1.1 mm.

1. Evaluation of the Orientated Pattern

The orientated patterns of Example 1 and Comparative Examples 1 and 2 were evaluated. FIG. 8 is an enlarged picture of the orientated photo-orientable layer of Example 1, and FIG. 9 is an enlarged picture of the phase retardation layer on the orientated photo-orientable layer of Example 1. FIG. 10 is an enlarged picture of the orientated photo-orientable layer of Comparative Example 1, and FIG. 11 is an enlarged picture of the phase retardation layer on the orientated photo-orientable layer of Comparative Example 1. FIG. 12 is an enlarged picture of the orientated photo-orientable layer of Comparative Example 2. As clearly confirmed from Figs., in Example 1, the border of the orientated pattern is clearly observed, and the phase retardation layer that has high degrees of accuracy is formed. However, in Comparative Examples 1 and 2 the border of the orientated pattern is unclear.

2. Evaluation of the Un-Orientated Region and the Crosstalk Ratio

With respect to the orientated photo-orientable layers of Example 1 and Comparative Examples 1 and 2, the ratio of the area of un-orientated region in the photo-orientable layer, relative to the entire area of the photo-orientable layer was evaluated. Also, the crosstalk ratios with respect to each orientated photo-orientable layers were evaluated.

In the above, the ratio of the area of un-orientated regions was evaluated by observing the regions, at which the light leakage is generated, by a polarizing microscope under the state where the optical filter was disposed between two polarizers, of which light absorbing axises were perpendicular to each other, by appropriately aligning the orientating directions of the optical filter along the light absorbing axises of polarizers, and then the polarizers were lighted by a light source.

Also, the crosstalk ratio was evaluated by applying the optical filter to a conventional polarizing glass type stereoscopic image display device and then evaluating the brightness 1.8 m away from the center of the image display surface of the stereoscopic image display device by changing the brightness of the unit pixel for the right eye and the unit pixel for the left eye. The crosstalk ratio was calculated by the General formulas 1 to 3 by the evaluated brightness.

The results of the evaluations are shown in Table 1 below.

TABLE 1

| | The ratio of the area of un-orientated region (%) | The crosstalk ratio (%) |
|---|---|---|
| Example 1 | About 0.9 | 0.5 |
| Comparative Example 1 | About 37 | 10 |
| Comparative Example 2 | About 93 or more | 20 |

As clearly confirmed from Table 1, in Example 1, the ratio of the area of the un-orientated region in the photo-orientable layer and the crosstalk ratio are minimized.

FIG. 13 is a picture of a stereoscopic image display device, to which the optical filter prepared in Example 1 was applied, which was observed with a polarizing glass. FIG. 13(a) is a picture observed with a polarizing glass for a right eye, and FIG. 13(b) is a picture observed with a polarizing glass for a left eye.

As shown in FIG. 13, if images for a left eye and a right eye, which have different polarizing properties from each other and which are coming from the optical filter of the present invention, are observed with one side of the polarizing glass, they are displayed as black when their polarizing directions are perpendicular with respect to the orientating direction of a phase retardation film of the polarizing glass; and they are displayed as white when their polarizing directions are parallel with respect to the orientating direction of a phase retardation film of the polarizing glass. Also, it is confirmed that the black and white in the same film are clearly changed when observing with the other side of the polarizing glass.

BRIEF DESCRIPTION FOR THE DRAWINGS

Figure 1:
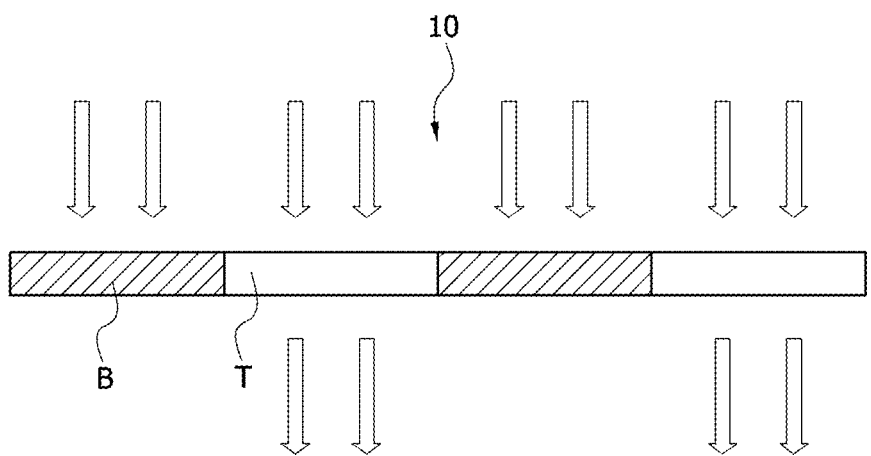
FIG. 1 is a cross sectional drawing that shows one example of the substrate included in the pressure sensitive adhesive film.
Figure 2:
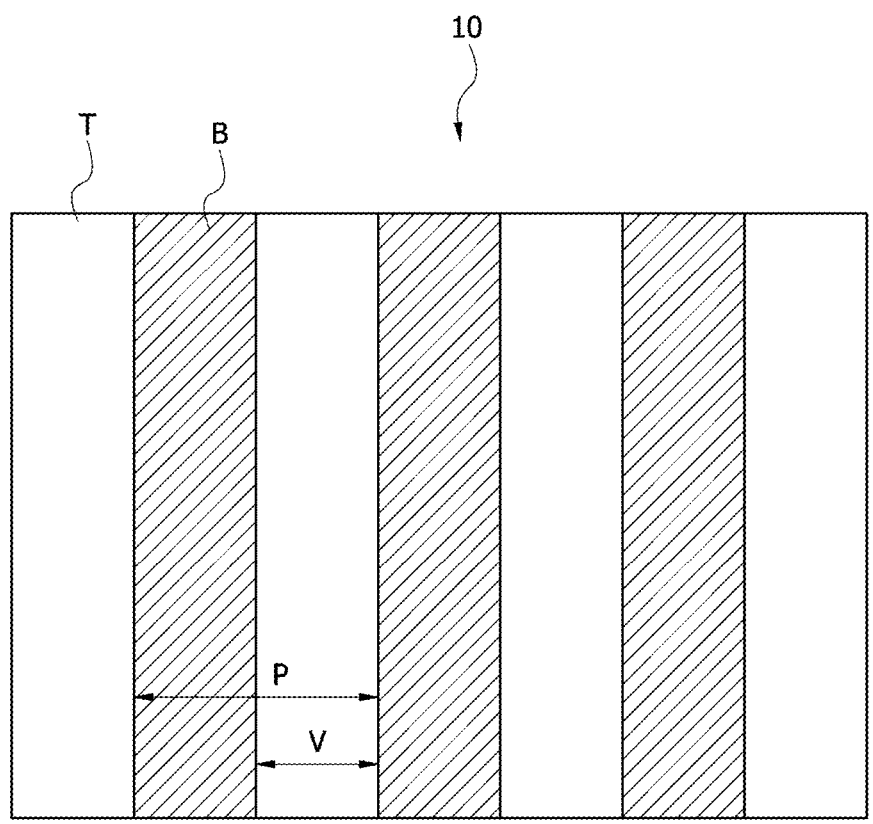
FIG. 2 is a drawing that shows an illustrative example of the substrate observed from the upper side thereof.
Figure 3:
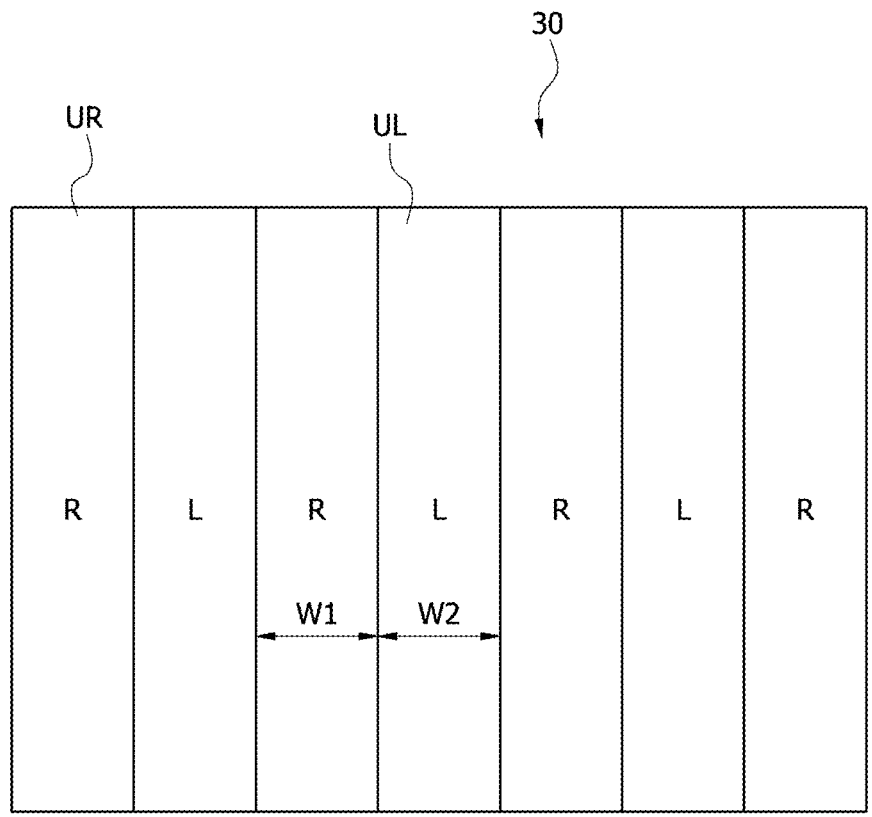
Figure 4:
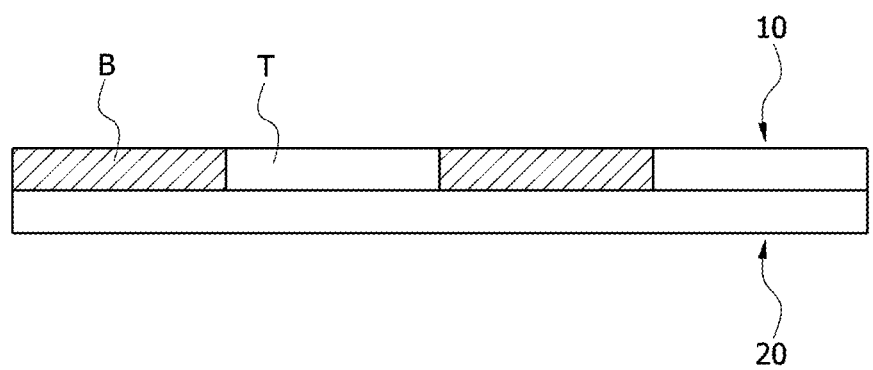
Figure 5:
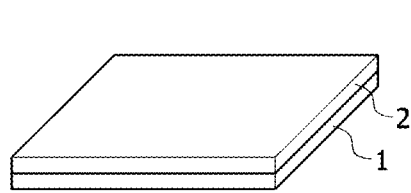
Figure 5:
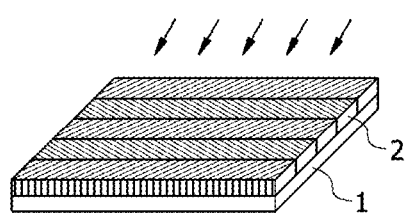
Figure 5:
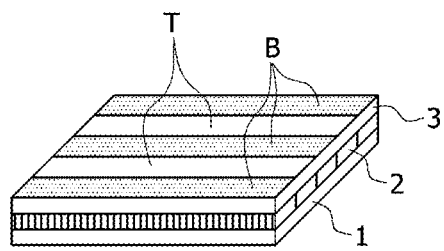
Figure 5:
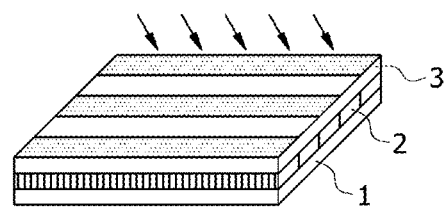
Figure 5:
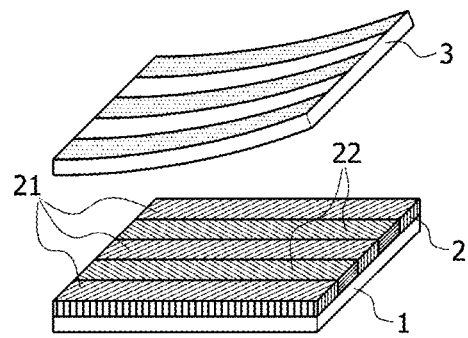
Figure 5:
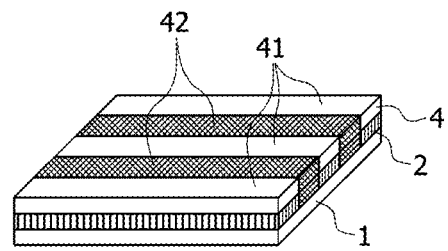
Figure 6:
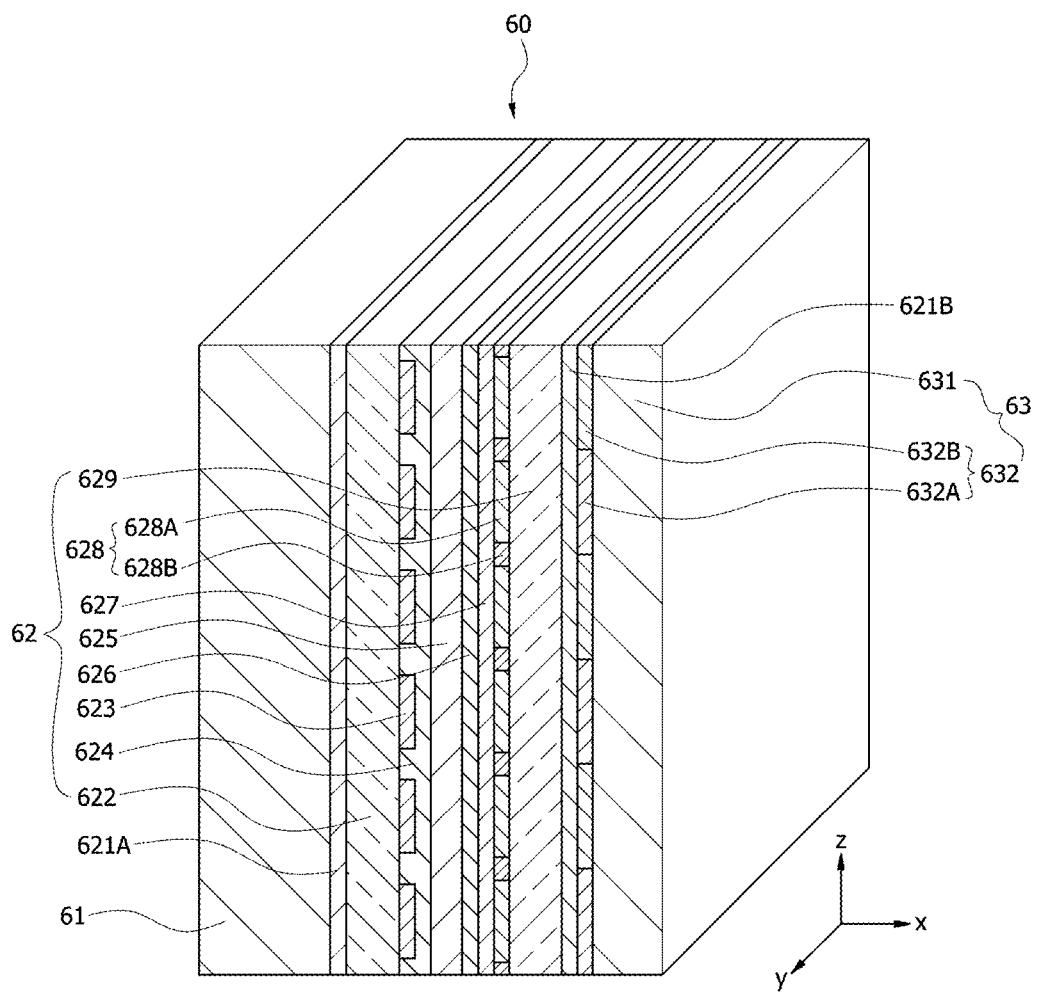
Figure 7:
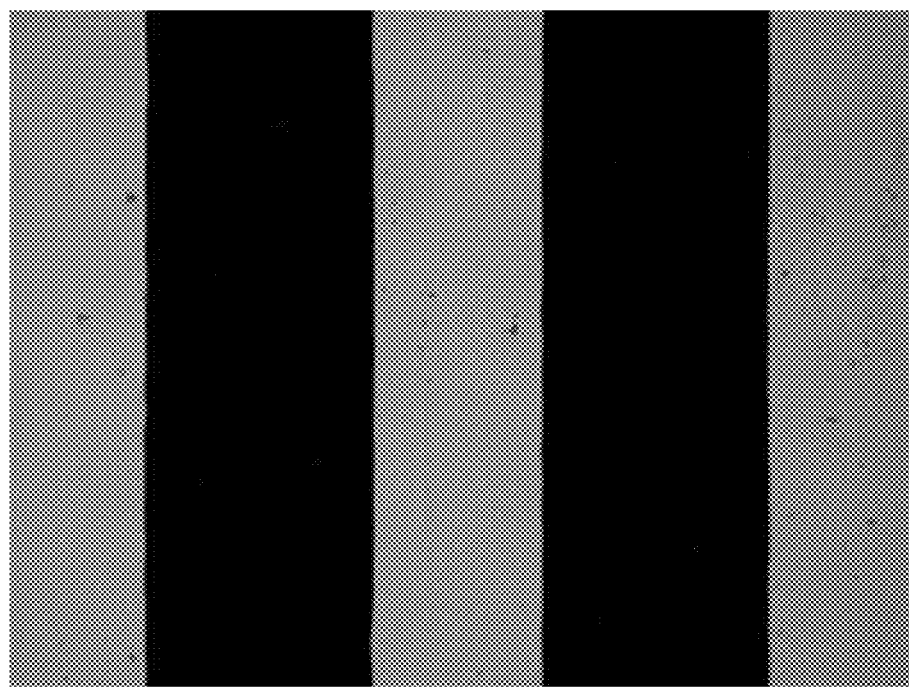
Figure 8:
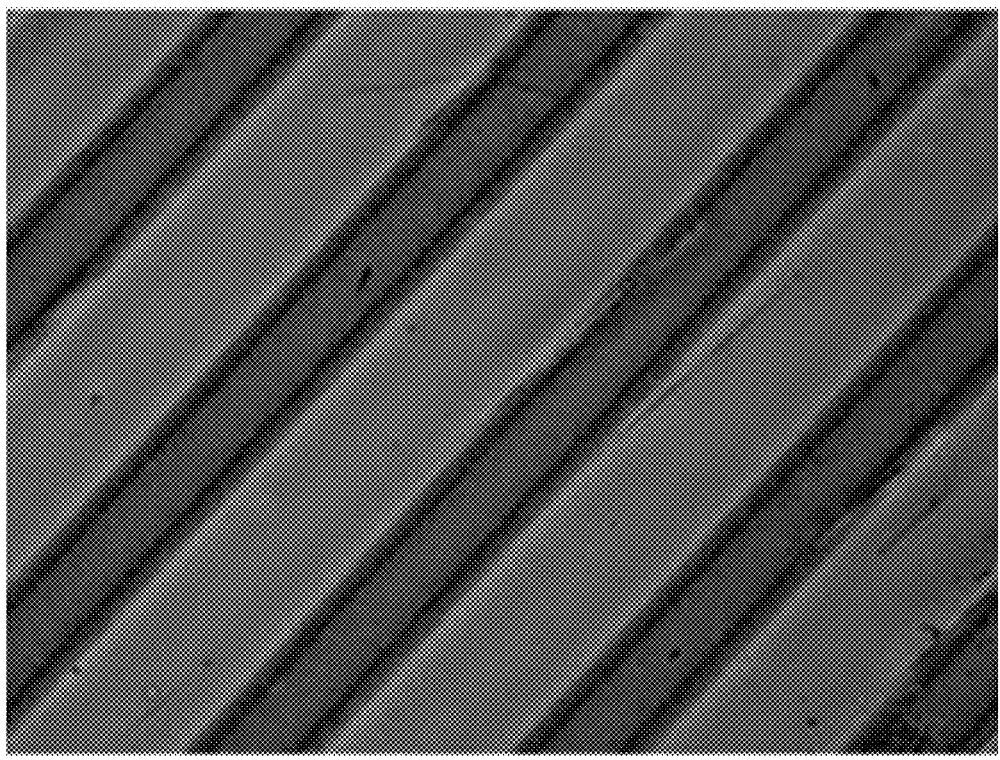

FIG. 3 is a drawing that shows an illustrative example of shapes of a unit pixel (UL) for forming an image for the left eye and an unit pixel (UR) for forming an image for the right eye in an element for displaying images FIG. 4 is a cross sectional drawing of one illustrative example of the pressure sensitive adhesive film FIG. 5 is a drawing showing one illustrative example of the process for preparing an optical filter of the present invention FIG. 6 is a cross sectional drawing of one illustrative example of the display device FIG. 7 is a picture of the front side of the pressure sensitive adhesive film prepared in Example FIG. 8 is an enlarged picture of the orientated photo-orientable layer of Example 1

Figure 9:
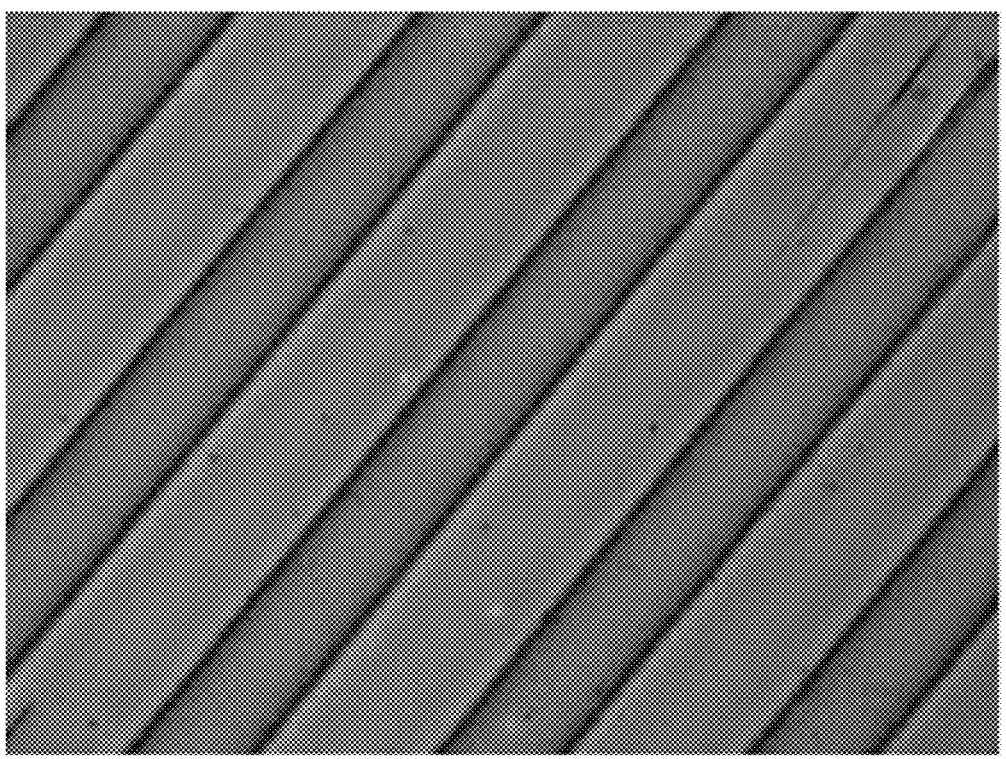

FIG. 9 is an enlarged picture of the phase retardation layer on the orientated photo-orientable layer of Example 1

Figure 10:
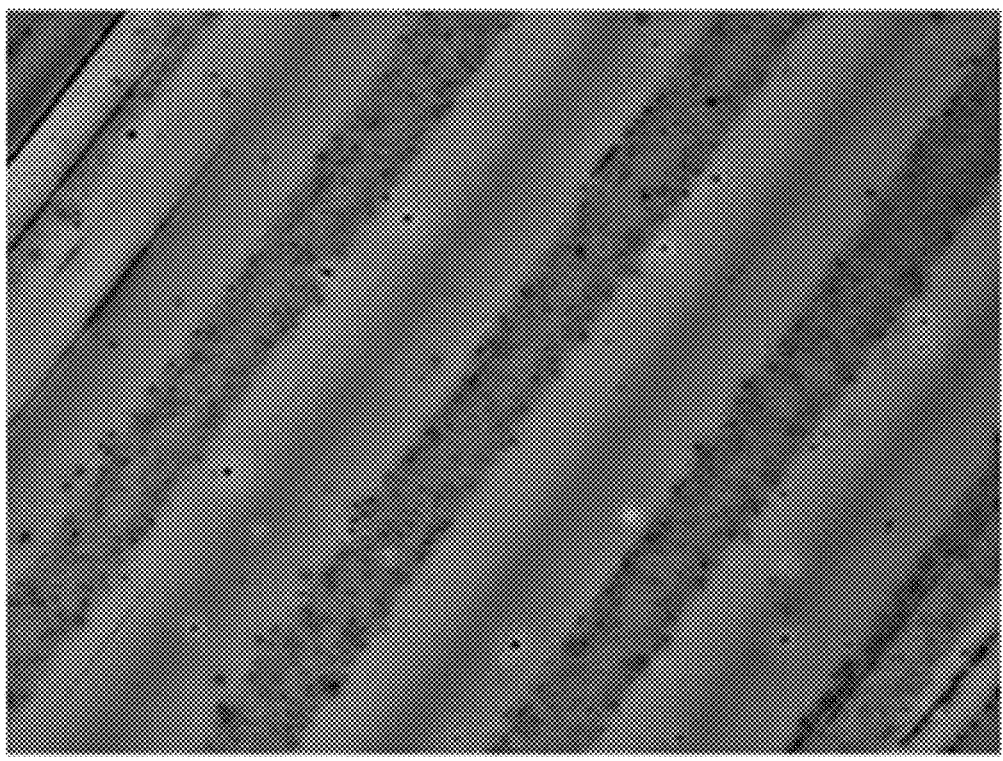

FIG. 10 is an enlarged picture of the orientated photo-orientable layer of Comparative Example 1

Figure 11:
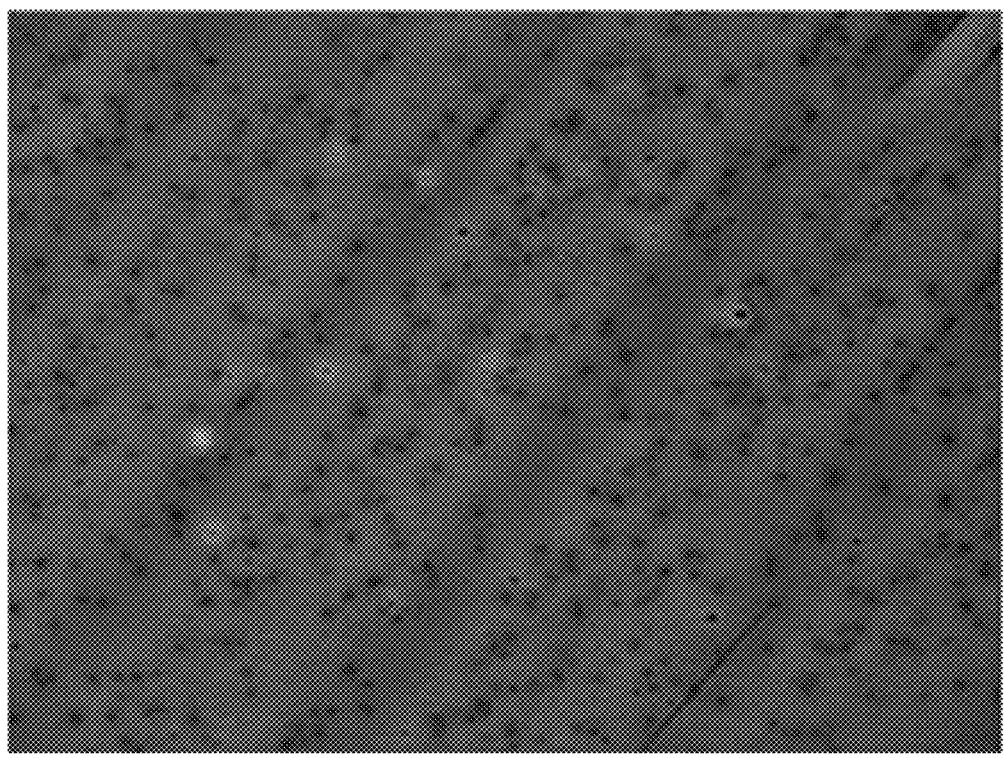

FIG. 11 is an enlarged picture of the phase retardation layer on the orientated photo-orientable layer of Comparative Example 1

Figure 12:
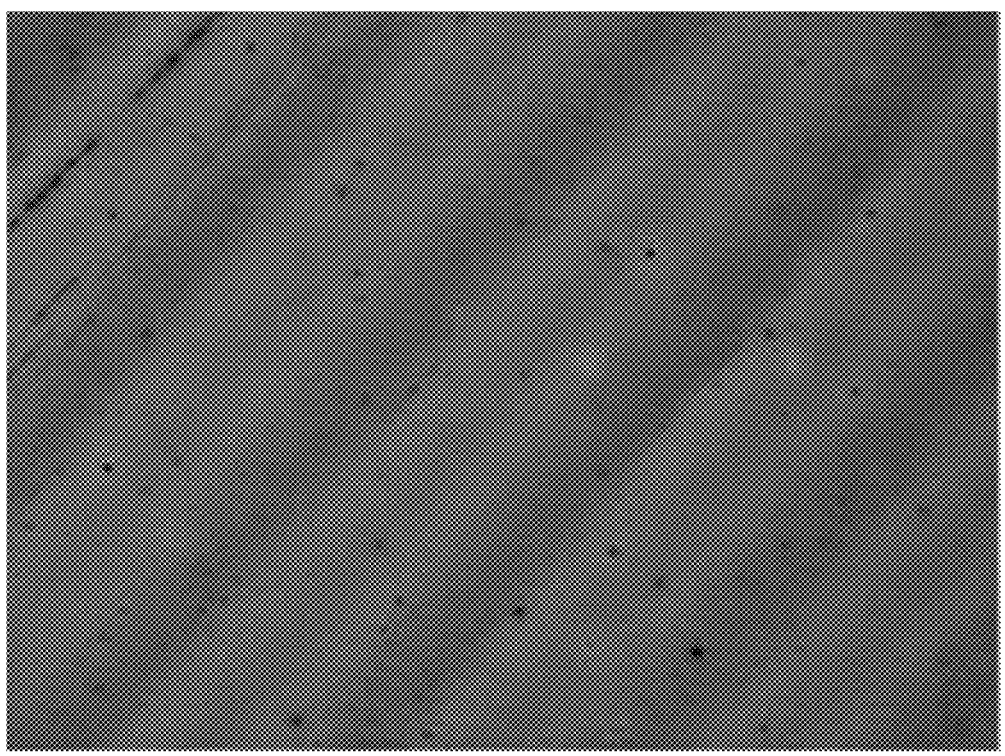

FIG. 12 is an enlarged picture of the orientated photo-orientable layer of Comparative Example 2

Figure 13:
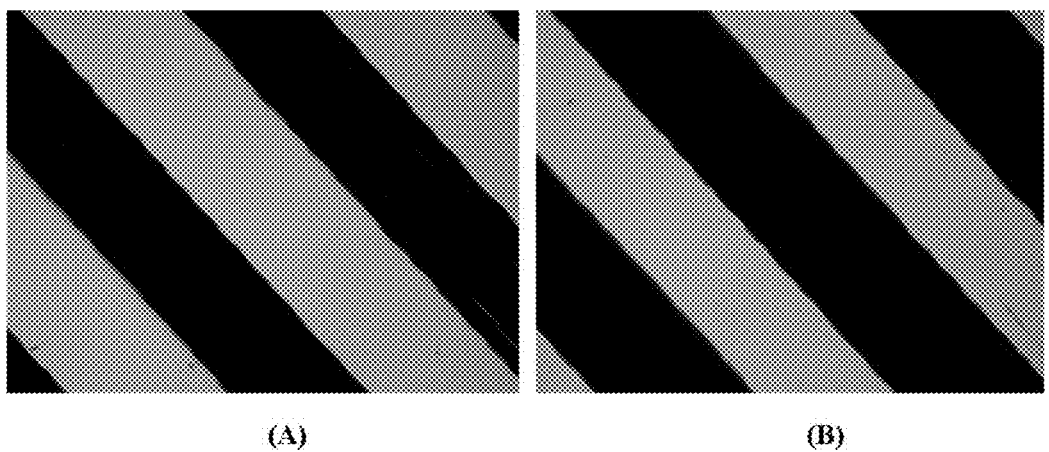

FIG. 13 is a picture of a stereoscopic image display device, to which the optical filter prepared in Example 1 is applied, and which is observed with a polarizing glass

The invention claimed is:

1. A process for preparing an optical filter, comprising:
preliminarily orienting a photo-orientable layer by irradiating the entire surface of the photo-orientable layer with linearly polarized light having a predetermined direction without using a mask;
attaching, on the preliminarily oriented photo-orientable layer, a pressure sensitive adhesive film comprising a substrate in which at least one light transmissive portion and at least one light blocking portion are formed and a pressure sensitive adhesive layer that is formed on a side of the substrate opposite to a printing side of the substrate, wherein the pressure sensitive adhesive layer is directly attached to the preliminarily oriented photo-orientable layer and attaches the substrate to the preliminarily oriented photo-orientable layer, wherein the substrate comprises a light transmissive sheet, light blocking inks or light absorbing inks are printed on the light with light blocking inks or light absorbing inks that are printed on the light transmissive sheet and form the light blocking portion, the light transmissive sheet is a cellulose sheet or an olefin sheet, and a printing height of the light blocking inks or the light absorbing inks is 0.5 µm to 2.0 µm; and
irradiating the preliminarily orientated photo-orientable layer with linearly polarized light having a different direction from that of the light in the preliminary orienting step through the light transmissive portion of the substrate of the pressure sensitive adhesive film attached on the preliminarily orientated photo-orientable layer,
wherein, after irradiation of the photo-orientable layer with the linearly polarized light having the different direction, the photo-orientable layer has at least one first oriented region having a first orienting direction and at least one second oriented region having a second orienting direction that is different from the first orienting direction, and a ratio of the area of regions in the photo-orientable layer that generate light leakage relative to the entire area of the photo-orientable layer is 2% or less.

2. The process for preparing an optical filter according to claim 1, further comprising detaching the pressure sensitive adhesive film after irradiating the preliminarily oriented photo-orientable layer, and then forming a liquid crystal layer on the photo-orientable layer.

3. The process for preparing an optical filter according to claim 2, wherein the step of forming a liquid crystal layer comprises: (a) coating and orientating photo-crosslinkable or photo-polymerizable liquid crystal compounds on the photo-orientable layer, and then (b) photo-crosslinking or photo-polymerizing the liquid crystal compounds.

4. The process for preparing the optical filter of claim 1, wherein the light blocking inks or the light absorbing inks comprise inorganic pigment or organic pigment.

5. The process for preparing the optical filter of claim 4, wherein the inorganic pigment is carbon black, graphite or oxidized steel, and the organic pigment is azo pigment or phthalocyanine pigment.

* * * * *